(No Model.)
W. D. WELLS.
COFFEE POT.
No. 523,188. Patented July 17, 1894.
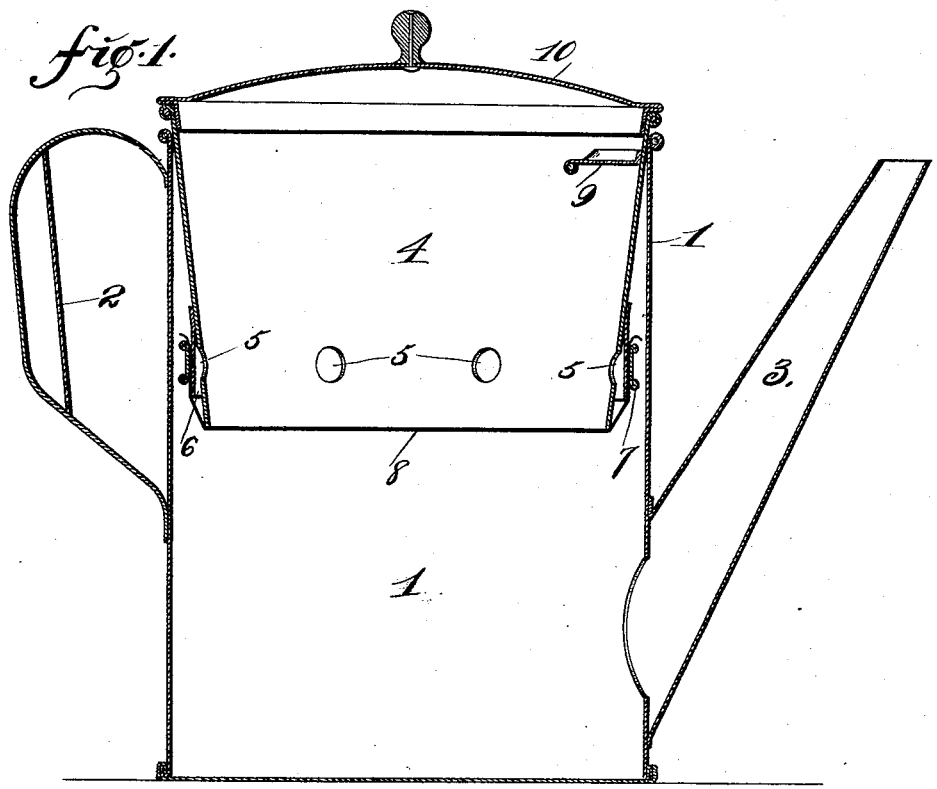
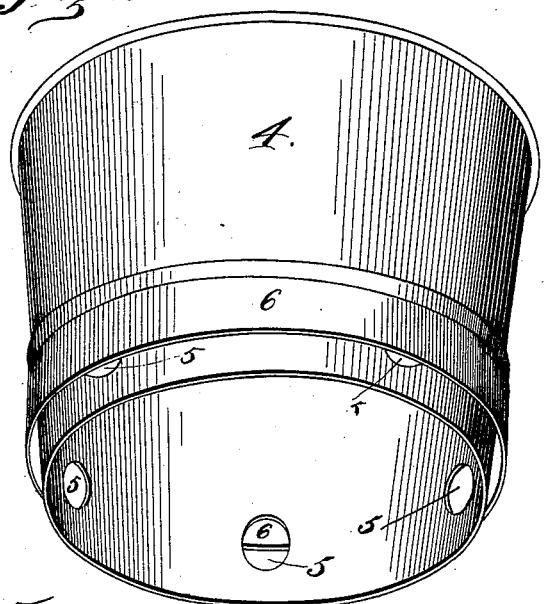
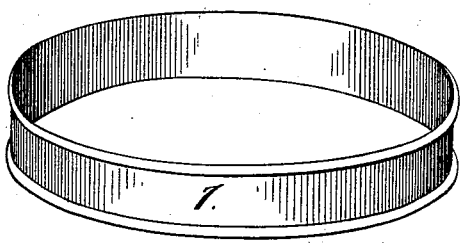
Attest.
M. P. Smith
Wm. J. Bankey.
Inventor.
Wm. D. Wells.
By Higdon & Higdon & Longan
Att'ys.

UNITED STATES PATENT OFFICE.

WILLIAM D. WELLS, OF AVA, ILLINOIS.

COFFEE-POT.

SPECIFICATION forming part of Letters Patent No. 523,188, dated July 17, 1894.

Application filed January 29, 1894. Serial No. 498,297. (No model.)

*To all whom it may concern:*

Be it known that I, WILLIAM D. WELLS, of the city of Ava, Jackson county, and State of Illinois, have invented certain new and useful Improvements in Coffee-Pots, of which the following is a full, clear, and exact description, reference being had to the accompanying drawings, forming a part hereof.

The object of my invention is to construct a coffee pot having a drainer therein, having a greater drainage surface than those of ordinary construction, and at the same time a drainer that will be cheap, efficient in use, and practical in results.

To the above object my invention consists in certain new and novel features of construction that will be hereinafter set forth.

In order that my invention may be more fully understood, I will now proceed to describe it, reference being had to the accompanying drawings, in which—

Figure 1 is a vertical sectional view of a coffee pot with my improved drainer located therein. Fig. 2 is a perspective view of my improved drainer. Fig. 3 is a perspective view of my retaining band used in connection with my device.

Similar figures refer to similar parts throughout the several views.

The numeral 1 designates a coffee pot which may be of the ordinary construction, provided with handle 2 and spout 3.

The drainer is preferably made of sheet metal and is tapered from its upper to its lower end, and of a length approximately half that of the coffee pot. In alignment in the circumference, and at a point near the lower end of this drainer are apertures 5, preferably circular in form. An auxiliary cylindrical ring 6 is fixed preferably by means of solder, immediately above these apertures 8, and extends downward in a vertical line, thus leaving a slight space between the said ring 6 and the wall of the drainer 4. The retaining ring 7 is of such diameter that it will easily slip over this auxiliary ring 6. A piece of draining cloth or other material 8, incloses the bottom of the drainer 4, its ends extending upward and between the auxiliary rings 6 and the retaining ring 7.

A plate 9 is located on the interior of the drainer 4 and at a point near its upper end to retain the coffee grounds while coffee is being poured from the coffee pot.

The drainer 4 extends slightly above the top of the coffee pot 1, and is fitted with an ordinary cover 10.

In the practical operation of my device, the parts being together as shown in Fig. 1; ground coffee is deposited within the drainer upon the drain cloth 8. The boiling water now being poured into the drainer and upon the ground coffee, passes to the lower part of the coffee pot through the drain cloth and apertures 5. This operation being repeated a suitable number of times gives the proper strength and quality to the coffee.

In ordinary drainers the hot water would pass through the ground coffee and out through the drain cloth provided, but by my improved drainer a much greater drainage surface is provided, and while allowing the hot water to pass through the drain cloth directly, it also passes through the apertures 5 and thence through the drain cloth 8 at the lower end of the annular space between the ring 6 and the tapered strainer, thus allowing the said hot water to mingle with all of the ground coffee.

In ordinary drainers I find that when ground coffee is deposited upon the drain cloth, and hot water poured therein said hot water does not pass freely through the coffee by reason of the ground coffee becoming somewhat packed, thus retarding the flow of the water through the ground coffee. By my device it will be seen that this objection is overcome, by reason of the hot water passing directly through the apertures 5, the drain-cloth 8 covering the space between the lower ends and the drainer 4, the auxiliary-ring 6, and into the lower part of the coffee pot. This method of making coffee is known by the culinary term or expression "drip coffee."

The advantages derived from my invention are the rapidity in making coffee, the ease and quickness of arranging the parts for use, and cheapness with which the drainer may be manufactured.

Another advantage gained is in cleaning the drainer and coffee-pot, as such operation can be quickly and easily done.

What I claim is—

The improved coffee-pot, comprising a tapered drainer 4 having a series of transverse apertures adjacent its lower end, a fixed cylindrical ring 6 secured at its upper edge to the outer surface of said tapered drainer and overhanging said apertures, so that there is an annular space between the lower edge of said cylindrical ring and the lower end of said tapered drainer, whereby the adjacent surfaces of said ring and drainer are located at an angle relative to each other, a cloth detachably extending across the lower end of said drainer and across said annular space and mounted upon the outer surface of said ring, and a movable retaining ring 7 mounted upon said cloth and binding it in position upon the outer surface of said fixed ring, in combination with a supporting vessel and cover, substantially as herein specified.

In testimony whereof I affix my signature in presence of two witnesses.

WILLIAM D. WELLS.

Witnesses:
ROGER WALWARK,
F. W. MEISENHEIMER.